United States Patent [19]

Shimada et al.

[11] Patent Number: 4,641,213

[45] Date of Patent: Feb. 3, 1987

[54] MAGNETIC HEAD

[75] Inventors: Yutaka Shimada, Sendai; Takashi Hatanai; Koichi Mukasa, both of Koide; Keishi Nakashima, Yunotani, all of Japan

[73] Assignee: Alps Electric Co., Ltd., Japan

[21] Appl. No.: 630,900

[22] Filed: Jul. 16, 1984

[30] Foreign Application Priority Data

Jul. 16, 1983 [JP] Japan .............................. 58-128721
Jul. 16, 1983 [JP] Japan .............................. 58-128724
Jul. 16, 1983 [JP] Japan .............................. 58-128715

[51] Int. Cl.$^4$ .......................... G11B 5/12; G11B 5/22
[52] U.S. Cl. ................................... 360/125; 360/122
[58] Field of Search ............... 360/119, 120, 121, 125

[56] References Cited

U.S. PATENT DOCUMENTS

| | | | |
|---|---|---|---|
| 3,656,229 | 4/1972 | Sakurai et al. | 360/120 X |
| 4,265,684 | 5/1981 | Boll | 360/120 X |
| 4,317,148 | 2/1982 | Chi | 360/119 |
| 4,488,195 | 12/1984 | Yanagiuchi et al. | 360/125 |

*Primary Examiner*—John H. Wolff
*Attorney, Agent, or Firm*—Guy W. Shoup

[57] ABSTRACT

A cobalt-base ternary alloy containing small amounts of hafnium and tantalum formed by sputtering, vapor deposition, etc., is used as the principal magnetic pole of a magnetic head for perpendicular magnetic recording, the core thin layers of a thin layer magnetic recording head, or the magnetic shield thin layers of a thin layer magnetic reproducing head. The ternary amorphous alloy has a high permeability and a high saturation magnetic flux density and hence the thickness of the foregoing layers composed of the alloy can be reduced as thin as possible.

3 Claims, 6 Drawing Figures

MAGNETIC HEAD

FIELD OF THE INVENTION

This invention relates to a magnetic head for perpendicular magnetic recording using a soft magnetic material having a high permeability composed of an amorphous alloy and, in particular, the invention relates to a thin layer type magnetic recording head and a thin layer type magnetic reproducing head.

BACKGROUND OF THE INVENTION

Hitherto, various perpendicular magnetic recording systems for magnetizing a magnetic layer formed in a magnetic recording medium in the thickness direction of the layer have been investigated for increasing the recording density of magnetic recording media. A magnetic head used for the recording system is generally composed of a principal magnetic pole facing a magnetic layer of a magnetic recording medium, an auxiliary magnetic pole paired with the principal magnetic pole, and a coil coiled around the auxiliary magnetic pole or the principal magnetic pole.

In such a magnetic head, the reproducing power and the resolving power can be easily increased since the foregoing principal magnetic pole can be reduced as thin as possible. However, when the principal magnetic pole becomes thinner, there occur problems of the magnetic saturation of the principal magnetic pole and the reduction in output at reproduction. For preventing the occurence of such problems, a high saturation magnetic density flux and an excellent soft magnetic character are required. However, by the use of permalloy which has hitherto been used as the principal magnetic pole, it is difficult to sufficiently increase the permeability and the saturation magnetic density. Accordingly, there is a limit in reproducing and resolving power in such a magnetic head.

Also, a thin layer type magnetic recording head is composed of a 1st core thin layer, a non-magnetic thin layer, and a 2nd core thin layer formed in laminate layers on a base plate composed of a non-magnetic material by sputtering or vapor deposition, and the thin layer type magnetic recording heat constitutes a thin layer magnetic head, together with a thin layer magnetic reproducing head as a pair. Such a thin layer magnetic head is used for, for example, a memory of a computer and, in this case, for increasing the recording efficiency in the thin layer magnetic recording head, it is necessary to use a soft magnetic material having a high permeability and a high saturation magnetic flux density as the 1st and 2nd core thin layers.

However, in the case of using permalloy, etc., which are conventionally used for the core thin layers, the core thin layers cause magnetic saturation at recording since permalloy, etc., has a low saturation magnetic flux density and a low permeability and hence in the case of recording signals in a magnetic recording medium having a high saturation magnetic flux density, such as a metal tape or a chromium dioxide tape, the recording efficiency is inferior.

Thus, for increasing the recording efficiency, it may be considered to prevent the reduction in recording efficiency by increasing the turn number of coils or increasing the recording electric current. However, it is difficult in the structure of the thin layer magnetic head to increase the turn number of coils or the turn number is restricted to about 3 turns, whereby a sufficient effect is not obtained. On the other hand, the increase of the recording electric current is accompanied by an increase in the amount of generated heat, the occurence of breaking, and the occurence of the deterioration of magnetic properties of the core thin layers.

Also, a thin layer magnetic reproducing head is composed of a base plate composed of a non-magnetic material, a 1st magnetic shield thin layer formed on a base plate, a magnetic resistance effect element (hereinafter, is referred to as MR element) formed on the 1st magnetic shield thin layer, a 2nd magnetic shield thin layer, etc., formed on the MR element. The thin layer magnetic reproducing head constitutes a thin layer magnetic head together with a thin layer magnetic recording head in a pair and such a thin layer magnetic head is used, for example, for a memory of a computer.

The magnetic shield thin layer used for the thin layer magnetic reproducing head is required to have a high permeability and a high saturation magnetic flux density for sufficiently exhibiting the function of the shield. As the magnetic shield thin layer, a binary permalloy composed of an iron-nickel alloy or a ternary permalloy composed of the iron-nickel alloy and a third element such as chromium, molybdenum, copper, etc., is usually used. However, in permalloy, it is generally difficult to sufficiently increase the permeability and saturation magnetic flux density and hence a sufficient shield effect cannot be obtained.

SUMMARY OF THE INVENTION

An object of this invention is to overcome various foregoing difficulties in conventional techniques.

Another object of this invention is to provide a magnetic head for a perpendicular magnetic recording system having high reproducing and resolving powers by reducing the thickness of the principal magnetic pole.

A still other object of this invention is to increase the recording efficiency on a thin layer magnetic recording head.

A further object of this invention is to increase the reproducing efficiency of a thin layer magnetic reproducing head by imparting a sufficient shield effect to the magnetic shield thin layers of the magnetic reproducing head.

As the results of various investigations on amorphous alloy thin layers obtained by sputtering, etc., the inventors have discovered that a cobalt-hafnium-tantalum ternary amorphous alloy mainly composed of cobalt and containing hafnium and tantalum, wherein the content of said hafnium is from 1 atom% to 5 atom%, preferably from 1.5 atom% to 3 atom% and the content of said tantalum is from 4 atom% to 10 atom%, preferably from 6 atom% to 8 atom%, has excellent properties as a soft magnetic material and that the soft magnetic material is very suitable for the principal magnetic pole of a perpendicular magnetic recording head, the core thin layers of a thin layer magnetic recording head, and the magnetic shield thin layers of a thin layer magnetic reproducing head.

DESCRIPTION OF THE PREFERRED EMBODIMENT

A crystal glass is used as a base plate and pellets of hafnium and pellets of tantalum (each pellet having 10 mm × 10 mm in area and 5 mm in thickness) are alternately disposed on a cobalt disk (101.6 mm in diameter and 5 mm in thickness) radially from the center of the disk, whereby the composition of the alloy formed on the base plate by sputtering can be changed by controlling the number of the pellets on the target. Then, a chamber containing the foregoing system is evacuated to high vacuum of lower than $1 \times 10^{-6}$ Torr and sputtering is performed in an argon gas atmosphere at a high frequency electric power of 2.0 watts/cm² to form a cobalt-base Co-Hf-Ta ternary amorphous alloy on the base plate. The amorphous alloys various compositions formed as above described are used for various property tests as set forth hereinafter.

Figure 1:
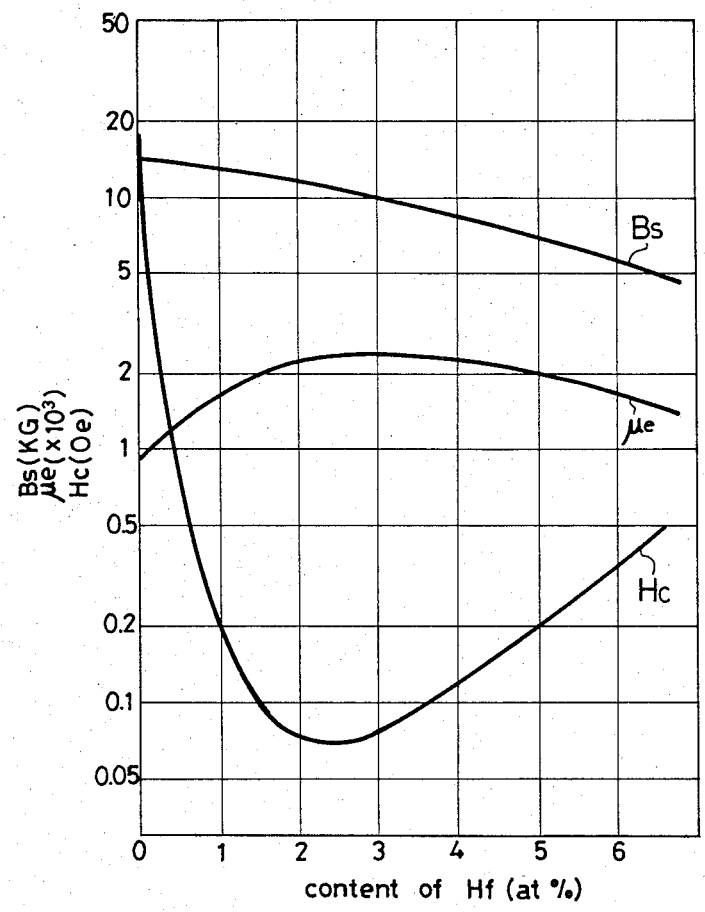
FIG. 1 is a characteristic graph showing the relation between the Hf content in Co-Hf-Ta system amorphous alloys and various magnetic properties.

FIG. 1 is a magnetic characteristic graph in the case of changing the content X of hafnium in the alloy shown in the alloy composition table shown below while always keeping the content Y of tantalum in the alloy at 4.5 atom%.

ALLOY COMPOSITION TABLE

Co: 100-X-Y atom%
Hf: X atom%
Ta: Y atom%

In addition, in the graph of FIG. 1, the curve Bs shows a saturation magnetic flux density, the curve $\mu_e$ a permeability in the sparingly magnetizable axis direction at a frequency of 1 MHz, and the curve Hc a coercive force in the sparingly magnetizable axis direction.

As is clear from the graph, the Co-Ta binary alloy containing no Hf has high Bs but is too high in Hc and low in $\mu_e$. However, when a small amount of Hf is present in the alloy, Hc greatly decreases, while $\mu_e$ increases in contrast with this. In addition, when the content of Hf is over a certain level, Hc becomes high and $\mu_e$ becomes low. On the other hand, Bs tends to decrease with the increase of the content of Hf although the decreasing extent is not so extreme.

In order to decrease Hc and and increase $\mu_e$ without reducing Bs too much in such a tendency of magnetic properties, it is necessary that the content X of Hf be in the range of from 1 atom% to 5 atom%, preferably from 1.5 atom% to 3 atom%. This is also true when the content Y of Ta is changed to some extent.

Figure 2:
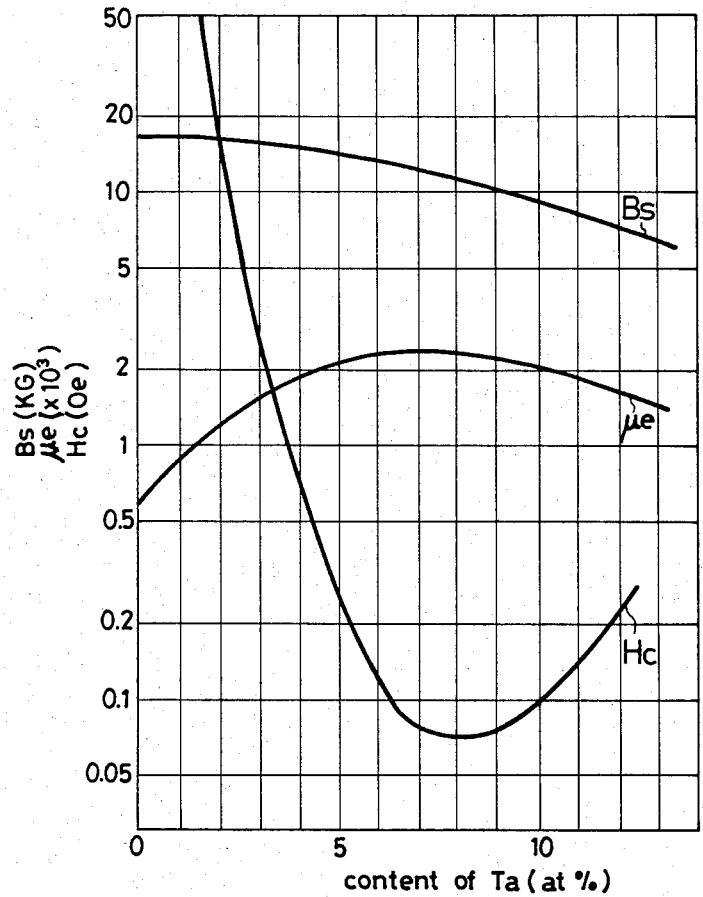
FIG. 2 is a characteristic graph showing the relation between the Ta content in the foregoing alloys and various magnetic properties.

FIG. 2 is a magnetic characteristic graph showing the case of changing the content Y of Ta in the alloy shown in the foregoing alloy composition table while always keeping the content X of Hf in the alloy at 2.2 atom%.

As is clear from the graph, in a Co-Hf binary alloy containing no Ta, Bs is high but Hc is too low and $\mu_e$ is low. However, when a small amount of Ta is present in the alloy, Hc becomes extremely low but $\mu_e$ becomes high in contrast with this. In addition, when the content of Ta is over a certain level, Hc becomes high and $\mu_e$ becomes low. On the other hand, Bs tends to decrease with the increase of the content of Ta although the reducing extent is not so extreme.

In order to reduce Hc and increase $\mu_e$ without reducing Bs too much in such a tendency of magnetic properties, it is necessary that the content Y of Ta be in the range of from 4 atom% to 10 atom%, preferably from 6 atom% to 8 atom%.

This is also true when the content X of Hf is changed to some extent.

Figure 3:
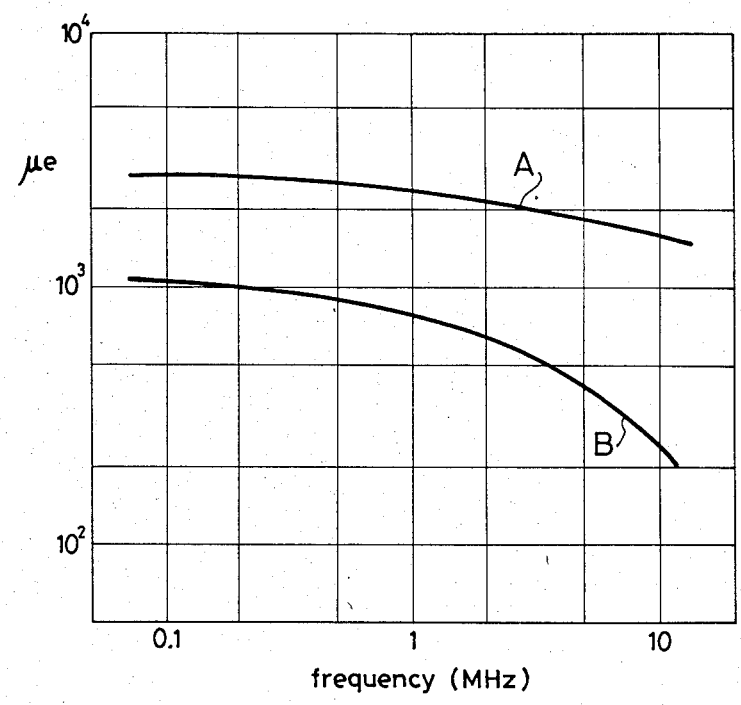
FIG. 3 shows magnetic characteristic curves of the foregoing alloy and a comparison alloy at each frequency.

FIG. 3 is a graph showing $\mu_e$ of a ternary amorphous alloy composed of Co (93.3 atom%), Hf (2.2 atom%), and Ta (4.5 atom%) (Curve A) and $\mu_e$ of a binary amorphous alloy composed of Co (97.8 atom%) and Hf (2.2 atom%) (Curve B) at each frequency.

As is clear from the graph, the soft magnetic material of this invention always has a high permeability at each frequency and shows stable characteristics in a wide frequency range.

Now, a Co-Hf-Ta ternary alloy shows a high anisotropic magnetic field in the thin layer thereof immediately after the formation thereof by sputtering. As the result of various investigations on the means for reducing the anisotropic magnetic field, it has been discovered that a method of heat-treating the ternary amorphous alloy thin layer formed as the principal magnetic pole in a rotating magnetic field is effective. The conditions for the heat treatment in the rotating magnetic field are selected from a rotation speed of 10 to 20 r.p.m., a magnetic field intensity of higher than 100 Oe and a treatment time of longer than 3 hours. For example, when the thin layer of the alloy formed by sputtering is treated at a temperature of 350° C., at a rotation speed of 10 r.p.m., and a magnetic field intensity of 100 Oe, the anisotropic magnetic field (Hk) can be reduced to about 4 Oe.

Figure 4:
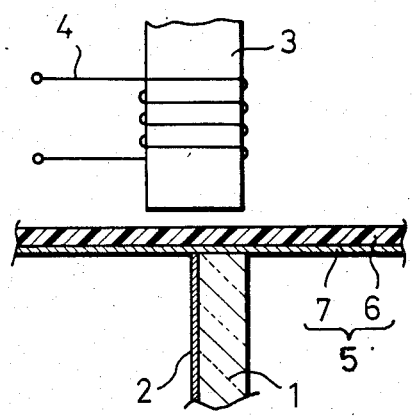
FIG. 4 is a schematic view showing a perpendicular magnetic recording head using the amorphous alloy.

FIG. 4 is a schematic view showing a perpendicular magnetic recording head using the foregoing soft magnetic material.

On one surface of an insulating base plate 1 composed of a glass or polyimide is formed a principal magnetic pole 2 of about 1 μm in thickness by sputtering. An auxiliary magnetic pole 3 is disposed in opposition to the principal magnetic pole 2 and a coil 4 is coiled around the auxiliary magnetic pole 3.

Between the principal magnetic pole 2 and the auxiliary magnetic pole 3 is movably inserted a tape-form or disk-form magnetic recording medium 5. The magnetic recording medium 5 is composed of a base film 6 and a magnetic layer 7 formed on one surface of the film and the magnetic recording medium 5 is so disposed that the magnetic layer 7 faces the foregoing principal magnetic pole 2. When a signal electric current to be recorded is passed through the foregoing coil 4 to magnetize the principal magnetic pole 2 from the side of the auxiliary magnetic pole 3, a strong perpendicular magnetic field is generated near the end of the principal magnetic pole 2, whereby the magnetic layer 7 disposed near the end of the principal magnetic pole 2 is magnetized in the thickness direction thereof to perform magnetic recording.

The foregoing principal magnetic pole 2 is composed of a Co-Hf-Ta ternary amorphous alloy thin layer, wherein the content of Co is 93.3 atom%, the content of Hf is 2.2 atom%, and the content of Ta is 4.5 atom%.

The principal magnetic pole is formed by sputtering and is heat-treated in a rotating magnetic field under the condition as described above, whereby the sparingly magnetizable direction of the amorphous alloy can be directed to the working direction of the principal magnetic pole.

Figure 5:
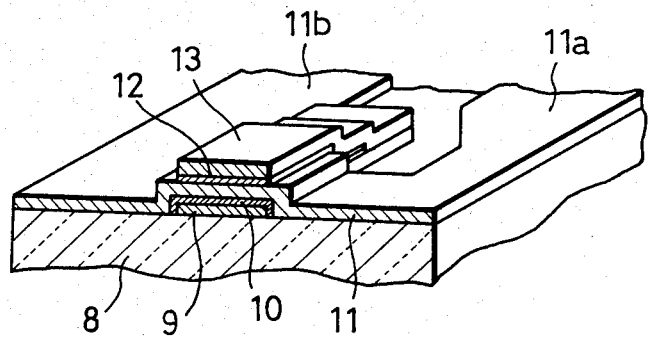
FIG. 5 is a partially sectional perspective view showing a thin layer magnetic recording head using the amorphous alloy.

FIG. 5 is a perspective view showing a part of a thin layer magnetic recording head using the foregoing soft magnetic material. On a base plate 8 composed of a non-magnetic material, such as a glass, silicon, etc., is first formed a 1st core thin layer 9. And a 2nd core thin layer 13 is formed thereon through an insulating thin layer 10 of a non-magnetic material, a conductive thin layer 11, and an insulating thin layer 12. These 1st core thin layer 9, insulating thin layer 10, conductive thin layer 11, insulating thin layer 12, and 2nd core thin layer 13 are successively formed at definite thicknesses by a film-forming technique such as sputtering, etc. In addition, numerals 11a and 11b indicate terminals for connecting to outside circuits.

The foregoing 1st core thin layer 9 and 2nd core thin layer 13 are composed of a Co-Hf-Ta ternary amorphous alloy, in which the content of Co is 93.3 atom%, the content of Hf is 2.2 atom%, and the content of Ta is 4.5% and these thin layers are heat-treated in a rotating magnetic field under the conditions as set forth before, whereby the sparingly magnetizable axis direction of the amorphous alloy can be directed to the working direction of the core thin layers.

Figure 6:
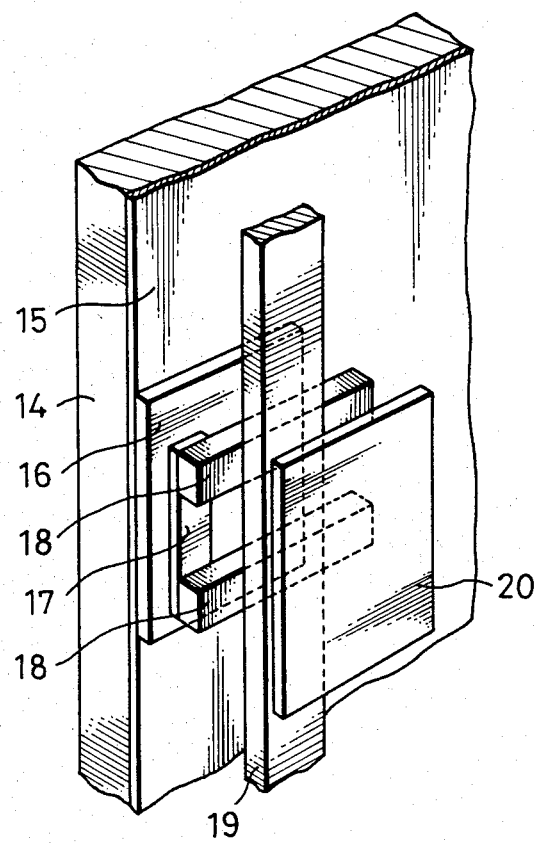
FIG. 6 is a perspective view showing, in separated form, the main portion of a thin layer magnetic reproducing head using the amorphous alloy.

FIG. 6 is a perspective view showing, in separated form, a thin layer magnetic reproducing head using the foregoing soft magnetic material. The numeral 14 shows a base plate composed of a non-magnetic material, 15 an insulating thin layer, 16 a 1st magnetic shield thin layer, 17 a MR element, 18 and 19 conductive thin layers, and 20 a 2nd magnetic shield layer.

The foregoing 1st magnetic shield thin layer 16 and 2nd magnetic shield thin layer 20 are composed of a Co-Hf-Ta ternary amorphous alloy thin layers, in which the content of Co is 93.3 atom%, the content of Hf is 2.2 atom%, and the content of Ta is 4.5 atom% and these shield thin layers are heat-treated in a rotating magnetic field under the foregoing conditions, whereby the sparingly magnetizable direction of the amorphous alloy is directed to the magnetic pass direction of the magnetic shield thin layers.

As described above, by defining the content of Hf to the range of 1 atom% to 5 atom% and the content of Ta to the range of 4 atom% to 10 atom% in a Co-base Co-Hf-Ta ternary amorphous alloy, a soft magnetic material having a low coercive force and a high permeability without reducing a saturation magnetic flux density can be obtained. By forming the principal magnetic pole of a perpendicular magnetic recording magnetic head using the soft magnetic material, the thickness of the principal magnetic pole can be extremely reduced since the ternary amorphous alloy has a high permeability and a high saturation magnetic flux density, whereby the reproducing and resolving powers of the magnetic head can be increased.

Also, when the core thin layers of a thin layer magnetic recording head are formed using the foregoing soft magnetic material, the recording efficiency and the reproducing efficiency of the magnetic head can be increased since the ternary amorphous alloy has a high saturation magnetic density and a high permeability.

Furthermore, when the magnetic shield thin layers of a thin layer magnetic reproducing head are formed using the foregoing soft magnetic material, the magnetic shield effect is sufficiently attained, the reproducing sensitivity can be improved, and the thickness of the magnetic shield thin layers can be further reduced since the ternary amorphous alloy has a high permeability and a high saturation magnetic flux density. Furthermore, in this case, by properly controlling the content ratio of hafnium and tantalum in the ternary amorphous alloy, the magneto-striction of the magnetic shield thin layers can be reduced to zero or near zero.

What is claimed is:

1. A magnetic head for perpendicular magnetic recording for magnetizing in the thickness direction of a magnetic layer of a magnetic recording medium by disposing the principal magnetic pole of the magnetic head facing a surface of the magnetic layer, wherein said principal magnetic pole is composed of a cobalt-based ternary amorphous alloy containing small amounts of hafnium and tantalum, wherein the content of hafnium is from 1 atom% to 5 atom% and the content of tantalum is from 4 to 10 atom%.

2. A thin layer magnetic head comprising a base plate composed of a non-magnetic material having formed thereon in layers a first core thin layer, a non-magnetic thin layer, and a second core thin layer, wherein the core layers are composed of a cobalt-based ternary amorphous alloy containing small amounts of hafnium and tantalum, wherein the content of hafnium is from 1 atom% to 5 atom% and the content of tantalum is from 4 atom% to 10 atom%.

3. A thin layer magnetic reproducing head comprising a magnetic resistance effect element having magnetic shield thin layers formed on both sides of the element, respectively, wherein the magnetic shield thin layers are composed of a cobalt-based ternary amorphous alloy containing small amounts of hafnium and tantalum, wherein the content of hafnium is from 1 atom% to 5 atom% and the content of tantalum is from 4 atom% to 10 atom%.

* * * * *